INVENTOR.
ALBERT W. COOK
JOHN W. RUNNER

Nov. 28, 1967  A. W. COOK ETAL  3,354,992

SPOT-TYPE DISC BRAKE WITH DUST COVER

Filed Aug. 23, 1965  3 Sheets-Sheet 3

INVENTOR.
ALBERT W. COOK
BY   JOHN W. RUNNER

*J.B.Holden*
ATTORNEY

United States Patent Office 3,354,992
Patented Nov. 28, 1967

3,354,992
SPOT-TYPE DISC BRAKE WITH
DUST COVER
Albert W. Cook, Tallmadge, and John W. Runner, Akron, Ohio, assignors to The Goodyear Tire & Rubber Company, Akron, Ohio, a corporation of Ohio
Filed Aug. 23, 1965, Ser. No. 481,856
4 Claims. (Cl. 188—73)

This invention relates to spot type, single disc brakes which can be inexpensively produced in large production quantitties from stamped sheet metal parts so as to adapt the brake for automotive or similar use.

In recent years, there has been a swing towards the use of single disc, spot type brakes on automobiles, but most known designs employ cast parts which are expensive and do not adapt themselves to inexpensive production manufacture in large quantities. Some efforts have been made to design brakes of the indicated type from sheet metal stamped parts but known designs of this character often involve a considerable number of parts, do not provide adequate torque mountings, or tend to bind up and not operate smoothly when subjected to the dirt, water and torque loads of actual use. Another difficulty of the prior art is that existing known stamped sheet metal brakes for automobiles of the spot pressure, single disc type are not readily serviceable.

It is the general object of the present invention to avoid and overcome the foregoing and other difficulties of and objections to prior art practices by the provision of an improved, relatively inexpensive, spot type, single disc brake adapted to be largely made from stamped sheet metal parts and in large production quantities, and particularly designed for automotive use.

Another object of the invention is to provide a brake of the type described utilizing but a single movable piston in the pressure unit, with the pressure unit being slidably carried on one fixed torque absorbing member and pivotally carried on a second torque absorbing member so that the pressure unit is allowed limited axial movement to and from the disc without binding or locking.

Another object of the invention is to utilize the dust shield of the brake as a hinged part-torque absorbing member, or stated alternatively, to utilize a part-torque absorbing member which is hinged as a dust shield.

Another object of the invention is to provide a member for absorbing torque from the braking unit, which member extends through a two part pressure unit, is slidably keyed to the pressure unit, and slidably carries one of the friction buttons of the pressure unit, all to facilitate absorbing brake torque into the member.

The foregoing objects of the invention, and other objects which will become apparent as the description proceeds, are achieved by the combination in a spot type brake of an axle, a wheel rotatable on the axle, a disc rotatable with the wheel, a stamped sheet metal pressure unit straddling a portion of the periphery of the disc, said pressure unit having an anvil portion on one side of the disc and a cup portion on the other side of the disc, a torque plate fixed to the axle and extending between the anvil portion and the cup portion of the pressure unit in a position closely parallel to the disc and radially beyond the disc, the radially outer end of the torque plate being bifurcated, a key joining the cup portion and anvil portion of the pressure unit and slidably extending through the bifurcated end of the torque plate, a piston slidably mounted in the cup portion, a block of friction material engaging the piston and movable by the piston against one side of the disc, said friction material extending slidably through a hole in the torque plate, a second block of friction material in the anvil portion and movable against the other side of the disc, means for supplying fluid under pressure to the cup portion behind the piston, a dust shield substantially covering one side of the disc and surrounding the torque plate, means securing the dust shield to the pressure unit, and means pivotally mounting the dust shield in relation to the torque plate at a distance greater than about one-half of the diameter of the disc from the pressure unit to provide low hinge loads and a hinged movement of the pressure unit to and from the disc.

For a better understanding of the invention, reference should be had to the accompanying drawings wherein.

Figure 1:
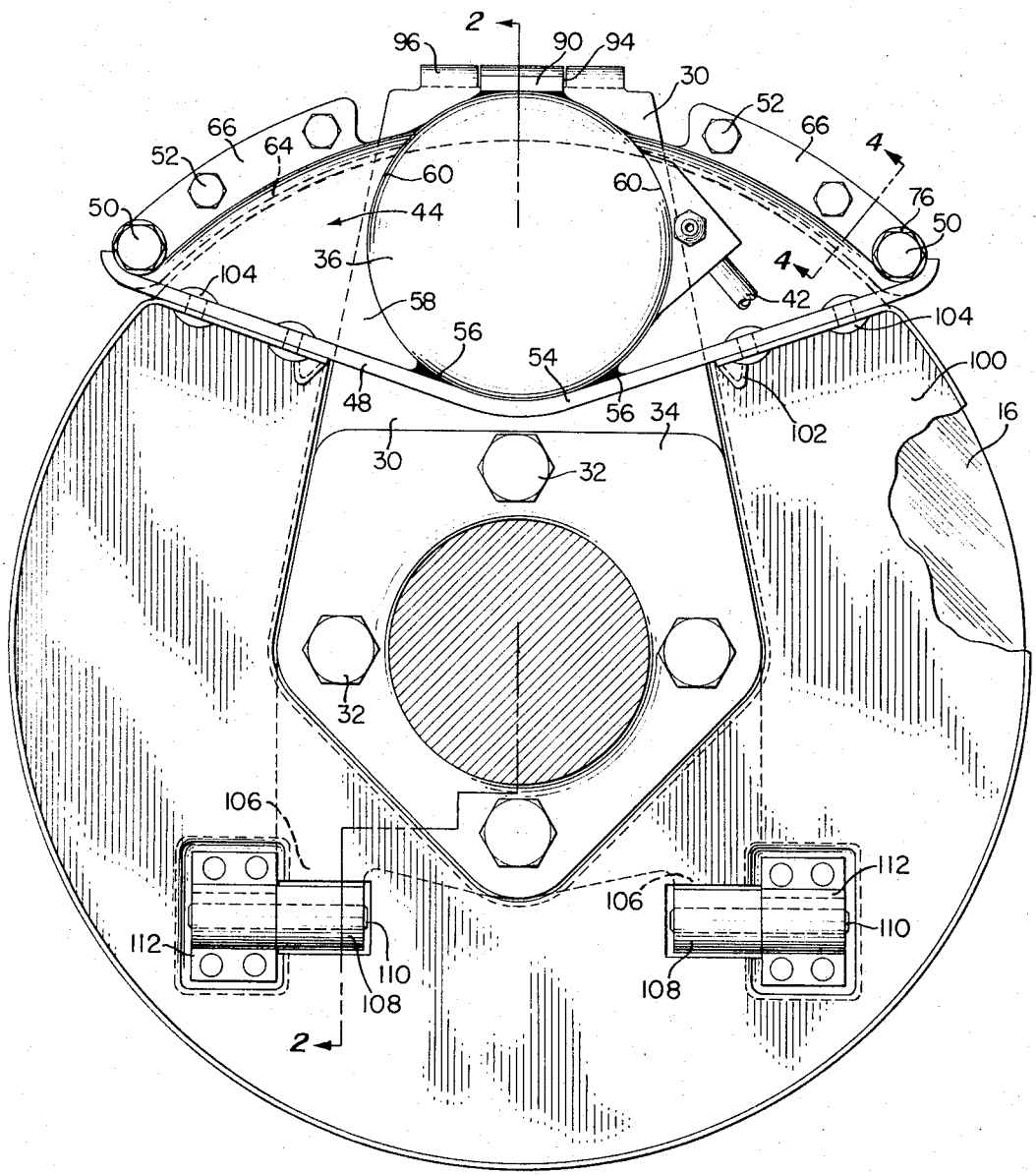
FIGURE 1 is an end elevation of one known best embodiment of the invention.

In the drawings, the numeral 10 indicates a wheel axle rotatably supporting a wheel hub 12 on bearings 14. Mounted on the wheel hub 12 is a brake disc 16 having an integral axially directed portion 18 and an integral radially directed portion 20, the latter being secured, as by bolts 22, to the wheel hub 12. Removably mounted on the wheel hub 12, as by the aforesaid bolts 22 is a wheel 24 carrying a rim 26, normally of the usual drop center construction. The rim 26 is positioned, as shown, to have one side extend out over the top of the brake disc 16.

The spot type pressure unit of the brake includes a torque plate 30 fastened by bolt means 32 to a torque flange 34 integral with the axle 10. The pressure unit comprises a stamped sheet metal cup 36 slidably receiving a piston 38 which is provided with sealing means, such as an O-ring 40, for sealing the piston 38 with the inside of the cup 36. Hydraulic fluid under pressure is adapted to be supplied to the left hand end of the piston as seen in FIGURE 2 by means of a conduit 42 shown in FIGURE 1.

Figure 3:
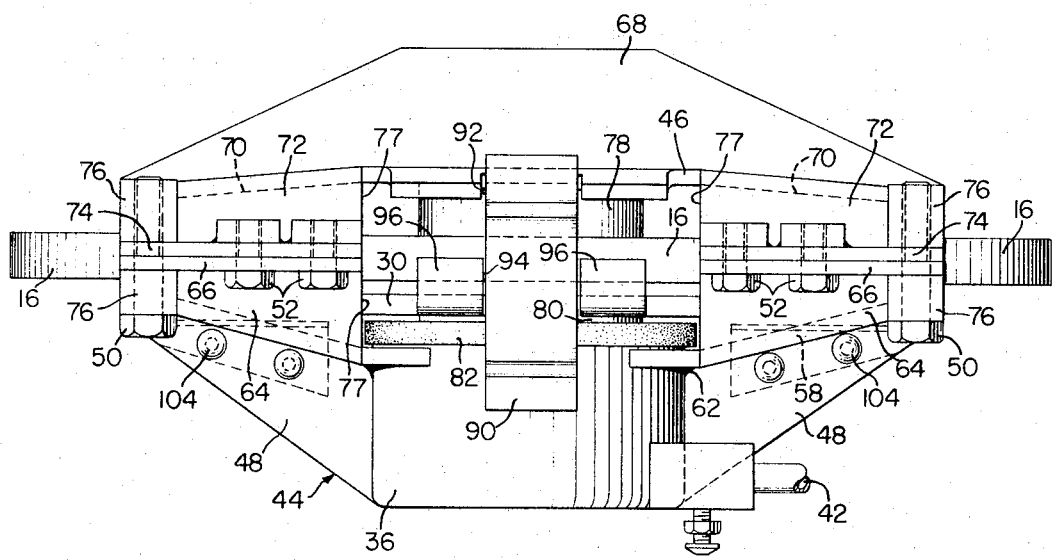
FIGURE 3 is a top or plan view of the brake shown in FIGURE 1.
Figure 4:
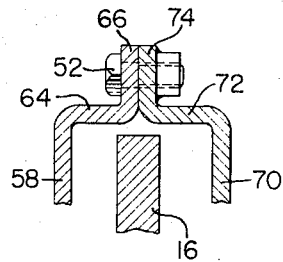
FIGURE 4 is a fragmentary cross sectional view taken on line 4—4 of FIGURE 1.

The sheet metal cup 36 is carried in a sheet metal housing member indicated as a whole by the numeral 44. The housing member 44 is made in two parts, namely, an anvil portion 46 and a cup portion or carrier 48. The anvil 46 and cup carrier 48 together straddle the brake disc 16 and are removably bolted together by bolt means 50 at their ends, and by cap screws 52 along their tops. The cup carrier 48 of the housing 44, as best seen in FIGURES 1 to 3, includes an axially parallel bottom flange 54 which extends underneath the lower edge of the cup 36 and is welded thereto at 56. Integral with the flange 54 is a vertically extending flange 58 at substantially right angles to the flange 54, the flange 58 having arcuate inner edges 60 which engage with the cup 36 towards the open end thereof, these flanges being welded to the cup at 62. Integral with the top of flange 58 is an inwardly turned flange 64 having a longitudinally curved contour so that the flange 64 lies closely adjacent to but is spaced slightly from the outer periphery of the brake disc 16. The flange 64 is formed with an integral right angle flange 66 through which the bolt means 52 extend (see FIGURE 4).

Turning now to the anvil portion 46 of the housing 44, this, also, is of stamped sheet metal, and comprises an axially directed flange or parallel portion 68 surrounding but spaced from the axially directed portion 18 supporting the brake disc 16. The flange 68 is formed integrally with a radially directed portion 70 joined to an axially directed flange 72 which terminates in the radially directed flange 74 through which the cap screws 52 extend (see FIGURES 2 and 4). In order to strengthen each of the anvil portion 46 and the cup portion 48 of the housing 44, cylindrical bosses 76 are provided at each end through which the bolt means 50 extend, and are also formed with a central opening 77 at their tops through which the torque plate 30 extends.

Figure 2:
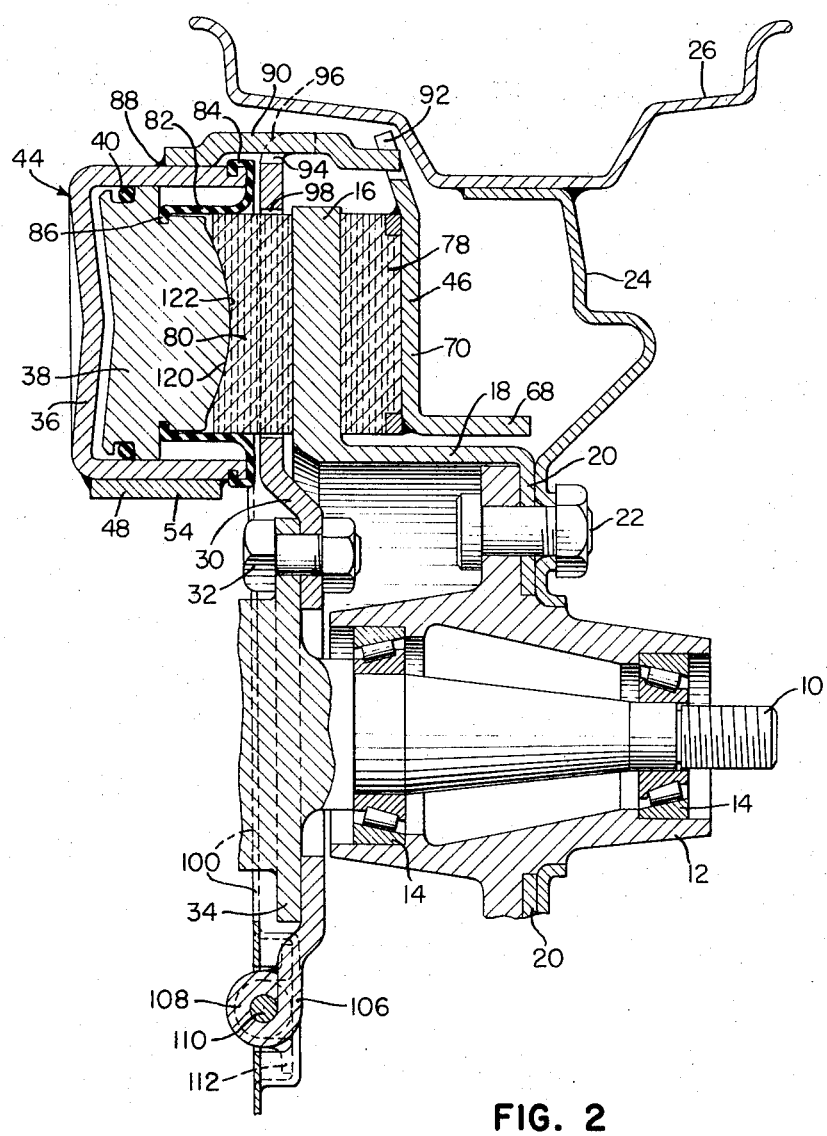
FIGURE 2 is a cross sectional view taken substantially on line 2—2 of FIGURE 1.

The anvil portion 46 of the housing 44 removably carries a block or button 78 of friction material which is adapted to be engaged with the side of the brake disc 16 in the manner best seen in FIGURE 2 of the drawings. The piston 38 slidably received in the cup 36 carries a block 80 of friction material adapted to be moved by the piston 38 into engagement with the other side of the brake disc 16, as again seen in FIGURE 2. For the purpose of sealing the piston 38 against water or dirt, a rubber sealing means 82 is provided in sleeve-like form, one end of the sealing means being anchored to the edge of the cup 36 at 84 and the other end of the rubber sleeve being anchored to the piston at 86.

Welded to the top of the cup 36 at 88 is a sheet metal key 90 which extends over the top of the disc 16 and which has its end remote from the cup 36 slidably received in a groove 92 in an extension of the flange 70 of the anvil portion 46 of the housing 44. The key 90 slidably engages with the outer end of the torque plate 30. For this purpose, the radially outer end of the torque plate 30 is bifurcated at 94 to straddle the key 90 and the bifurcated ends of the torque plate 30, marked 96, are bent down at right angles to lie at either side of the key 90.

The torque plate 30 is formed with a hole 98 therethrough which slidably receives the friction button 80 to further directly transmit torque into the torque plate 30 when the brake is applied.

An important feature of the invention is to provide a dust plate or cover 100, made of somewhat thinner sheet metal than the parts heretofore described and having a diameter somewhat larger than the disc 16, the dust shield 100 serving the dual purpose of a dust shield and a pivotal support for the brake housing 44. The upper end of the dust shield 100 is provided with a flange contoured to engage with the underside of the flange 54 of the cup carrying portion 48 of the brake housing 44, the dust shield 100 being formed with stiffener ribs 102 for this purpose, and with the dust shield being secured to the cup carrying portion 48 by rivets 104.

To pivotally mount dust shield 100, the torque plate 30 is provided with extending ears 106 terminating in hinge eyes 108 which rotatably support pins 110 held in the dust shield 100 by welded-on straps 112. Thus, the pressure unit or housing 44 is provided with a pivotal support having a radius greater than about one half the diameter of the disc 16.

In the form of the invention illustrated the dust shield 100 is cut out in the area of the torque plate 30, as best seen in FIGURE 1.

In the operation of the apparatus of the invention, the application of fluid under pressure through the conduit 42 to the inside of the cup 36 behind the piston 38 causes the piston 38 to move to the right in FIGURE 2 to thereby press the friction block 80 against the side of the disc 16. The hydraulic pressure on the bottom of the cup 36 causes it to move to the left in FIGURE 2 to pull the anvil portion 46 of the brake housing 44 to the left to thereby press the friction block 78 against the other side of the disc 16. The resulting brake torque is transmitted directly to the torque plate 30 for the reason that the friction button 80 is slidably received in opening 98 in the torque plate, and by reason of the fact that the bifurcated ends 96 of the torque plate 30 slidably engage with the side of the key 90 extending across the top of the brake housing 44.

Additionally, the torque on the brake housing 44 is taken to a considerably lesser extent through the dust shield 100 and the pivot pins 110 into the ears 106 of the torque plate. It might be said that the hinge means last described primarily perform the function of mounting the brake housing 44 for non-binding movement toward and from the disc 16 about the pivot pins 110 as lining wear occurs, rather than to perform a torque absorbing function. The relatively long hinge mounting thus provided for the brake housing 44 means that tapered wear on the friction button 78 and 80 is kept to a minimum, much less than would occur if the radius of the hinge mounting were short.

In addition, in order to reduce the tapered lining wear, the piston 38 is provided with a semi-spherical surface 120 which engages with a complementary semi-spherical recess 122 on the side of the friction button 80 so that the friction button 80 can tilt to a limited degree in relation to the piston.

As lining wear occurs during the use of the brake, the entire brake housing 44 gradually moves to the left as viewed in FIGURE 2 hinging about the pins 110, the piston 38 periodically positioning itself more to the right in piston cup 36 by automatic adjustment means not shown. No return spring means are shown in the brake assembly for the reason that upon release of the hydraulic pressure to the back of the piston 38, the linings 78 and 80 normally move to clearance position in relation to the disc 16 because of slight run out in the rotation of the disc 16.

In the relining of the brake the wheel 24 is removed to expose the brake unit. Then bolts 50 and cap screws 52 are removed to allow replacement of the friction button 78, the brake disc 16 is removed to allow replacement of the friction button 80 through the hole 98 in the torque plate 30, and the mechanism is reassembled.

The invention has been shown and described as including only a single piston and opposed anvil. Of course, more than one piston and opposed anvil could be employed in side by side, circumferentially-spaced relation if desired.

While a certain representative embodiment and details have been shown for the purpose of illustrating the invention, it will be apparent to those skilled in this art that various changes and modifications may be made therein without departing from the spirit or scope of the invention.

What is claimed is:

1. The combination in a spot type brake of an axle, a wheel rotatable on the axle, a disc rotatable with the wheel, a stamped sheet metal pressure unit straddling a portion of the periphery of the disc, said pressure unit having an anvil portion on one side of the disc and a cup portion on the other side of the disc, a torque plate fixed to the axle and extending between the anvil portion and the cup portion of the pressure unit in a position closely parallel to the disc and radially beyond the disc, the radially outer end of the torque plate being bifurcated, a key joining the cup portion and anvil portion of the pressure unit and slidably extending through the bifurcated end of the torque plate, a piston slidably mounted in the cup portion, a block of friction material engaging the piston and movable by the piston against one side of the disc, said friction material extending slidably through a hole in the torque plate, a second block of friction material in the anvil portion and movable against the other side of the disc, means for supplying fluid under pressure to to cup portion behind the piston, a dust shield substantially covering one side of the disc and surrounding the torque plate, means securing the dust shield to the pressure unit, and means pivotally mounting the dust shield in relation to the torque plate at a distance greater than about one-half of the diameter of the disc from the pressure unit to provide hinged movement of the pressure unit to and from the disc.

2. The combination in a spot type brake of an axle, a wheel rotatable on the axle, a disc rotatable with the wheel, a pressure unit straddling a portion of the periphery of the disc, said pressure unit having an anvil portion on one side of the disc and a cup portion on the other side of the disc, a torque plate fixed to the axle and extending between the anvil portion and the cup portion of the pressure unit in a position closely parallel to the disc and radially beyond the disc, the radially outer end of the torque plate being bifurcated, a key joining the cup portion and anvil portion of the pressure unit and slidably extending through the bifurcated end of the torque plate, a piston slidably mounted in the cup portion, a block of friction material engaging the piston and movable by the piston against one side of the disc, a second block of friction material in the anvil portion and movable against the other side of the disc, means for supplying fluid under pressure to the cup portion behind the piston, a dust shield covering one side of the disc, means securing the dust shield to the pressure unit, and means pivotally mounting the dust shield in relation to the axle to provide hinged movement of the pressure unit to and from the disc.

3. The combination in a spot type brake of an axle, a wheel rotatable on the axle, a disc rotatable with the wheel, a stamped sheet metal pressure unit straddling a portion of the periphery of the disc, said pressure unit having an anvil portion on one side of the disc and a cup portion on the other side of the disc, a piston slidably mounted in the cup portion, a block of friction material engaging the piston and movable by the piston against one side of the disc, a second block of friction material in the anvil portion and movable against the other side of the disc, means for supplying fluid under pressure to the cup portion behind the piston, a dust shield substantially covering one side of the disc, means securing the dust shield to the pressure unit, and means pivotally mounting the dust shield in relation to the axle at a distance greater than about one-half of the diameter of the disc from the pressure unit to provide hinged movement of the pressure unit to and from the disc.

4. The combination in a spot type brake of an axle, a wheel rotatable on the axle, a disc rotatable with the wheel, a pressure unit straddling a portion of the periphery of the disc, said pressure unit having an anvil portion on one side of the disc and a cup portion on the other side of the disc, a piston slidably mounted in the cup portion, a block of friction material engaging the piston and movable by the piston against one side of the disc, a second block of friction material in the anvil portion and movable against the other side of the disc, means for supplying fluid under pressure to the cup portion behind the piston, a dust shield substantially covering one side of the disc, means securing the dust shield to the pressure unit, and means pivotally mounting the dust shield in relation to the axle to provide hinged movement of the pressure unit to and from the disc.

References Cited

UNITED STATES PATENTS

| Re. 24,996 | 6/1961 | Butler | 188—73 |
| 2,820,530 | 1/1958 | Chousing et al. | 188—73 |
| 3,166,156 | 1/1965 | Burnett et al. | 188—73 |
| 3,260,332 | 7/1966 | Wells | 188—73 |

FOREIGN PATENTS

| 615,771 | 3/1961 | Canada. |
| 1,345,576 | 11/1963 | France. |
| 728,709 | 4/1955 | Great Britain. |
| 1,001,320 | 8/1965 | Great Britain. |

MILTON BUCHLER, *Primary Examiner.*

G. E. A. HALVOSA, *Assistant Examiner.*